United States Patent
La Marca et al.

(10) Patent No.: US 10,958,675 B2
(45) Date of Patent: Mar. 23, 2021

(54) METHOD FOR THE AUTOMATED CREATION OF RULES FOR A RULE-BASED ANOMALY RECOGNITION IN A DATA STREAM

(71) Applicant: Robert Bosch GmbH, Stuttgart (DE)

(72) Inventors: Antonio La Marca, Leonberg (DE); Markus Hanselmann, Stuttgart (DE); Thilo Strauss, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 16/179,195

(22) Filed: Nov. 2, 2018

(65) Prior Publication Data
US 2019/0182280 A1    Jun. 13, 2019

(30) Foreign Application Priority Data
Dec. 13, 2017 (DE) .......................... 102017222616.1

(51) Int. Cl.
| | |
|---|---|
| *H04L 29/06* | (2006.01) |
| *H04L 12/24* | (2006.01) |
| *H04L 12/26* | (2006.01) |
| *G06Q 10/06* | (2012.01) |
| *G06N 20/00* | (2019.01) |

(52) U.S. Cl.
CPC ........ *H04L 63/1425* (2013.01); *H04L 41/142* (2013.01); *H04L 41/16* (2013.01); *H04L 43/04* (2013.01); *H04L 43/106* (2013.01); *H04L 43/16* (2013.01); *H04L 63/1416* (2013.01); *H04L 2463/121* (2013.01)

(58) Field of Classification Search
CPC ..... H04L 63/20; H04L 63/1408; H04L 41/16; H04L 63/0263; G06F 2115/08; G06F 11/30; G06F 17/16
See application file for complete search history.

(56) References Cited

U.S. PATENT DOCUMENTS

| | | | |
|---|---|---|---|
| 10,200,262 B1* | 2/2019 | Leverich | H04L 43/0823 |
| 2010/0085891 A1* | 4/2010 | Kind | H04L 63/1425 370/253 |
| 2015/0113638 A1* | 4/2015 | Valasek | G06F 21/562 726/22 |
| 2017/0048263 A1* | 2/2017 | Chen | H04L 63/1425 |

(Continued)

*Primary Examiner* — Carl G Colin
*Assistant Examiner* — Andrew Suh
(74) *Attorney, Agent, or Firm* — Norton Rose Fulbright US LLP; Gerard Messina

(57) ABSTRACT

A method for creating rules for recognizing anomalies in a data stream of data packets. The method includes: providing a reference time signal having successive reference points in time; for at least two data portions from one or multiple data packets determined by a selected data packet type in a data stream section, ascertaining a time series of successive values of the relevant data portion, the values of the time series corresponding to the values of the relevant data portion or being a function of these values, the values of the relevant data portion each being assigned to a respective reference point in time of the respective reference points in time; carrying out a correlation method in order to ascertain, in each case, one correlation value for at least two different time series; creating a rule for the rule-based anomaly recognition method as a function of the ascertained correlation values.

11 Claims, 4 Drawing Sheets

(56) References Cited

U.S. PATENT DOCUMENTS

| | | | |
|---|---|---|---|
| 2018/0219889 A1* | 8/2018 | Oliner | G06N 3/08 |
| 2019/0028496 A1* | 1/2019 | Fenoglio | H04L 63/1408 |
| 2019/0124099 A1* | 4/2019 | Matselyukh | G06F 21/566 |
| 2019/0155672 A1* | 5/2019 | Wang | G06F 17/18 |

* cited by examiner

| time stamp | ID | DLC | | | | S | B | | |
|---|---|---|---|---|---|---|---|---|---|
| 0.0000 | 100 | 8 | 47 | 89 | FE | F7 | 1F  3F | FF | FF ←P |
| 0.0013 | 321 | 8 | 9B | 89 | 00 | 04 | 20 | 80 | 00 | FF |
| 0.0015 | 121 | 8 | 3A | 0B | 81 | 0C | 0C | 00 | 00 | 00 |
| 0.0016 | 211 | 8 | 99 | 06 | C4 | AA | 2C | FF | FF | FF |
| 0.0018 | 321 | 8 | 9B | 99 | 01 | 25 | 37 | 42 | 01 | FF |
| 0.0021 | 221 | 8 | 9B | 89 | AE | 25 | 37 | 42 | 01 | FF |
| 0.0022 | 141 | 8 | 3A | 0B | 81 | 0C | 0C | 00 | 00 | 00 |
| 0.0024 | 211 | 8 | 99 | 07 | C4 | 30 | 2D | FF | FF | FF |
| 0.0026 | 231 | 8 | AE | 99 | 01 | 25 | 37 | 42 | 01 | FF |
| 0.0027 | 151 | 8 | 9B | 89 | 00 | 9A | FF | FF | FF | FF |
| 0.0029 | 127 | 8 | 3A | 0B | AE | 0C | 0C | 00 | 00 | 00 |
| 0.0032 | 211 | 8 | 99 | 08 | C4 | AA | 2D | FF | FF | FF |
| 0.0033 | 453 | 8 | AE | 99 | 01 | 25 | 37 | 42 | 01 | FF |

Fig. 3

| time stamp | ID | DLC | | | B | | | | | |
|---|---|---|---|---|---|---|---|---|---|---|
| 0.0016 | 211 | 8 | 99 | 06 | C4 | AA | 2C | FF | FF | FF |
| 0.0024 | 211 | 8 | 99 | 07 | C4 | 30 | 2D | FF | FF | FF |
| 0.0032 | 211 | 8 | 99 | 08 | C4 | AA | 2D | FF | FF | FF |
| ⋮ | ⋮ | ⋮ | ⋮ | ⋮ | | | | | | |

METHOD FOR THE AUTOMATED CREATION OF RULES FOR A RULE-BASED ANOMALY RECOGNITION IN A DATA STREAM

CROSS REFERENCE

The present application claims the benefit under 35 U.S.C. § 119 of German Patent Application No. DE 102017222616.1 filed on Dec. 13, 2017, which is expressly incorporated herein by reference in its entirety.

FIELD

The present invention relates to anomaly recognition methods for recognizing anomaly data in a data stream, as well as methods for creating rules for recognizing anomalous data segments in a data stream.

BACKGROUND INFORMATION

In systems having multiple control units, data may be exchanged between the control units via a network such as, for example, a serial field bus. One example of such a field bus is the CAN bus (CAN: Controller Area Network). The CAN bus is used predominantly in motor vehicles and enables a per-packet data transmission from one control unit to one or multiple other connected control units.

During the transmission of data via the serial field bus, deviations from a normal behavior, referred to as anomaly, may occur during real operation. Causes for such deviations may be defective or failed subsystems or control units, which supply erroneous data or no data at all. Systems may also be manipulated by an external source, data packets transmitted via the field bus being manipulated or new data packets being introduced. In a properly operating system, data packets are transmitted error-free between control units that are connected to one another via the bus system, as a rule, the data packets in general being interdependent as a result of specific correlations, both stationary and well as chronological.

For the operational reliability of vehicle systems, it is essential to recognize anomalies early, in particular, anomalies that occur externally in connection with a manipulation of the vehicle system. For such purpose, the data communication is monitored using an anomaly recognition method.

Modern anomaly recognition methods are often rule-based. Rules correspond to definitions for events that may represent a potential anomalous behavior, and are made up of a list of queries, checks and inferences, on the basis of which data portions, data packets or groups of data packets of the data stream transmitted via the field bus are checked. In the process, these rules are manually derived from a communication matrix, so that the design of the rule system may not be generalized and must be constructed separately for each vehicle type. Rules based on the communication matrix are created as a rule corresponding to the matrix specification, i.e. based on the frequency with which the information is provided or based on the type of the transmitted information. In rules established in this way, physical connections between the transmitted pieces of information are not taken into account or are not detected.

SUMMARY

According to the present invention, a method is provided for creating rules for a rule-based anomaly recognition method for a data stream transmitted via a communication link, as well as an anomaly recognition system.

Additional embodiments are described herein.

According to a first aspect of the present invention, a method is provided for creating at least one rule for a rule-based anomaly recognition system for recognizing anomalies in a data stream made up of data packets, the data packets including a data segment made up of one or multiple data portions and the data packets being assigned a time stamp and a data packet type, including the following steps:

providing a reference time signal having successive reference points in time;

for at least two data portions from one or multiple data packets determined by a selected data packet type in a data stream section, ascertaining in each case a time series of successive values of the relevant data portion, the values of the time series corresponding to the values of the relevant data portion or being a function of these values, the values of the relevant data portion each being assigned to a respective reference point in time of the reference points in time;

carrying out a correlation method in order to ascertain, in each case, one correlation value for at least two different time series; and creating the at least one rule for the rule-based anomaly recognition method as a function of the ascertained correlation values.

In accordance with the present invention, the example method for creating rules for a rule-based anomaly recognition method automatically creates rules via an analysis of a data stream section. For this purpose, correlations between values of data portions in data packets are evaluated, so that dependencies between different data portions of the same or of different sources may be located. In this way, rules may be created for the anomaly recognition method, which may not be readily derived from the communication matrix, even if the communication matrix is present. By establishing a correlation matrix, it is possible to recognize positive as well as negative correlations. From this, rules may be created in an automated manner. This expands the possibilities for creating a rule system for an anomaly recognition method.

The term data packet within the context of the present invention corresponds to a data sequence, to which a logical connection may be assigned.

Furthermore, the reference time signal may be predefined by the points in time of time stamps of successive data packets having a selected identical data packet type or by a synthetic time vector, for example, by an equidistant time vector at a predefined frequency.

According to one specific embodiment, the values of the relevant data portion may be assigned to the reference points in time by selecting, for each of the reference points in time, a time stamp having a time reference from the time stamps of the appearance of the data packet that includes the relevant data segment, in particular, the time stamp, which is nearest the relevant reference point in time, and the value of the relevant data portion from the data packet that includes the selected time stamp is added to the time series.

It may be provided that the values of the time series are ascertained from the values of the relevant data portion via interpolation methods, in particular, Nearest Neighbor, Linear Mixed Neighbor, Previous Neighbor, Shape-Preserving Piecewise Cubic Interpolation.

The correlation values may also be ascertained with the aid of a Pearson correlation.

According to one specific embodiment, the rule for the anomaly recognition may be derived from the ascertained correlation values by creating a rule for those data portions, for which the correlation value is within a particular interval, in particular, has an absolute value that is greater than a predefined correlation threshold, the rule specifying that a chronological change of the values of the related data portions in data packets transmitted consecutively is concurrent or is non-concurrent.

It may be provided that the rule for the anomaly recognition is derived from the ascertained correlation values by ascertaining for multiple data stream sections correlation values for two different data portions in each case, the rule specifying that a change of the correlation values obtained from various data stream sections is within a particular interval, in particular, in terms of absolute value, falls below a predefined threshold value.

The data packet type may be determined, in particular, by an ID identifier contained in the data packet.

It may be provided that the at least one rule is generated with the aid of a (convolutional) autoencoder, of a LSTM (Long short-term memory), of a Generative Adversarial Network (GAN).

According to another aspect of the present invention, a method for recognizing anomalies is provided, data packets of a data stream being checked for anomalies in accordance with one or multiple rules, at least one of the rules being created with the above method.

According to another aspect of the present invention, a device is provided for creating at least one rule for a rule-based anomaly recognition method for recognizing anomalies in a data stream made up of data packets, the data packets including a data segment made up of one or multiple data portions and the data packets being assigned a time stamp and a data packet type, the device being designed in order:

to provide a reference time signal having successive reference points in time;

for at least two data portions from one or multiple data packets determined by a selected data packet type, in a data stream section, to ascertain in each case a time series of successive values of the relevant data portion, the values of the time series corresponding to the values of the relevant data portion or being a function of these values, the values of the relevant data portion each being assigned to a respective reference point in time of the reference points in time, to carry out a correlation method in order to ascertain, in each case, one correlation value for two different time series;

to create at least one rule for the rule-based anomaly recognition method as a function of the ascertained correlation values.

According to another aspect of the present invention, a device for recognizing anomalies is provided, which is designed to check data packets of a data stream for anomalies in accordance with one or multiple rules, at least one of the rules being created with the above method.

BRIEF DESCRIPTION OF THE DRAWINGS

Specific embodiments are explained in greater detail below with reference to the figure.

FIG. 3 shows an example of a data stream section.

FIG. 4 shows an example of selected data packets corresponding to a reference ID identifier.

FIG. 6 shows a representation of a correlation matrix.

DETAILED DESCRIPTION OF EXAMPLE EMBODIMENTS

Figure 1:
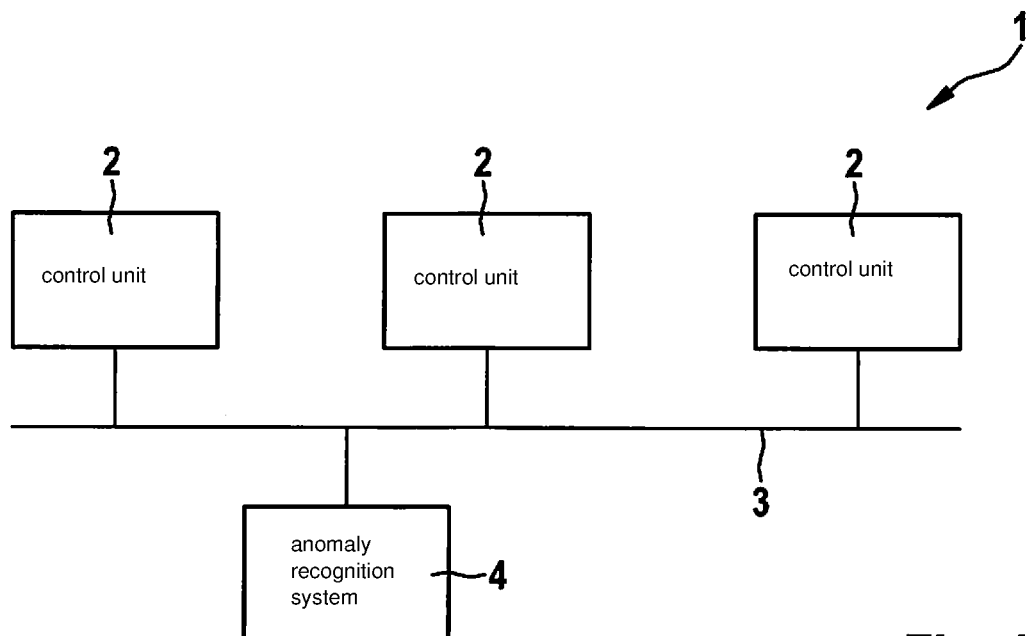
FIG. 1 schematically shows a representation of a system that includes multiple control units, which are linked to one another via a communication bus.

FIG. 1 schematically shows a representation of an overall system 1 that includes multiple control units 2, which are linked to one another via a communication bus 3 (communication link). Communication bus 3 may correspond to a field bus or some other data bus such as, for example, a CAN bus (field bus in motor vehicles). A data stream, made up of a sequence of data that are logically divided into successive data packets, may be transmitted via communication bus 3. In the process, a data packet is transmitted from one of control units 2 to at least one additional control unit of control units 2.

Linked to communication bus 3 is an anomaly recognition system 4, which may be designed separately or as part of one of control units 2. Anomaly recognition system 4 also reads along the data transmitted via communication bus 3 and carries out an anomaly recognition based on predefined rules.

Data packets P transmitted via communication bus 3 are defined by or include a time stamp, i.e., the point in time from which the relevant data packet P is sent, a data packet type, which is indicated in the present exemplary embodiments as an ID identifier, with which the source or the purpose of the data packet is characterized, and a data segment S. Data segment S may include one or multiple data portions B, which correspond to a piece of information to be transmitted. Data portions B may each include individual bits, groups of bits, one or multiple bytes.

A rule-based anomaly recognition method is carried out by checking one or multiple anomaly conditions predefined by corresponding rules with respect to each of data portions B. An improper data packet, i.e., an anomaly data packet is assumed if at least one anomaly condition is met. Previous rules for recognizing anomalies represent, for example, queries for data packets of a particular ID identifier, so that the value ranges for data portions B of data segment S are defined. If, for example, a value of a data portion B is outside the predetermined range, an anomaly is then recognized. Rules may also be time-based, for example, a particular data packet type or a particular ID identifier having to appear at least once within a predetermined time period, otherwise an anomaly is also recognized. If no anomaly condition is met, an unremarkable, i.e., proper data packet P is assumed.

Figure 2:
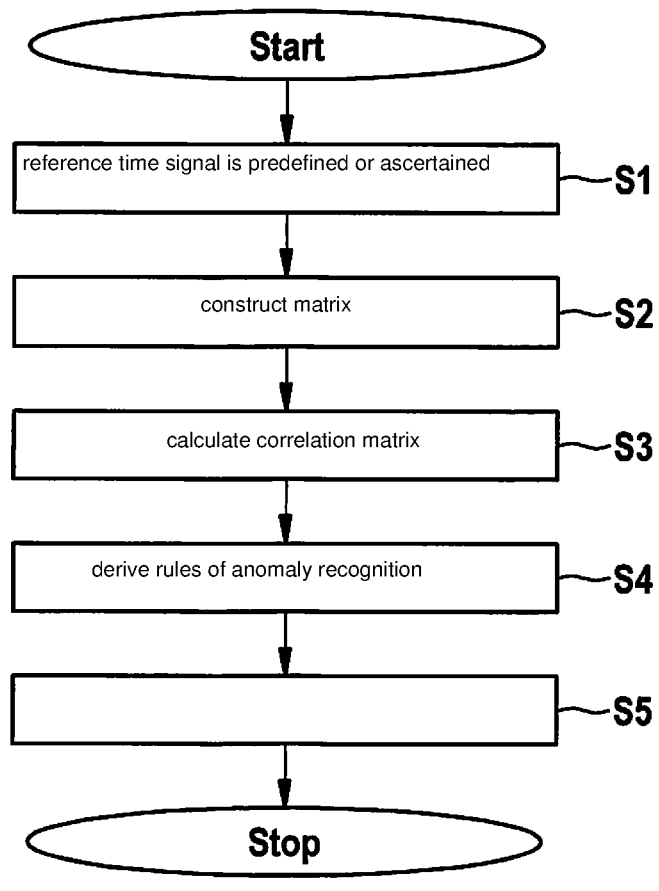
FIG. 2 shows a flow chart for illustrating a method for creating rules for an anomaly recognition method based on automatically created rules.

To create or refine rules for the anomaly recognition, the following method is additionally carried out, which is illustrated in the form of a flow chart in FIG. 2.

The method is based on a section of a data stream, as it is depicted, for example, in FIG. 3, including a number of data packets P having various ID identifiers ID.

In step S1, a reference time signal t is predefined or ascertained, which defines points in time to which an examination of data packets P is intended to relate.

To ascertain a reference time signal t, a reference ID may be selected, which is, in particular, a data packet having an ID identifier ID, which plays a central role in the communication between control units 2. All data packets P having this reference ID identifier are then extracted from the data stream section, as depicted in FIG. 4. Time stamps $t_1, \ldots,$ $t_n$ of these data packets represent reference time signal $t=(t_1, \ldots, t_n)$. Reference time signal t may also be provided separately from a predefined reference ID identifier, for example, by an equidistant time vector at a predefined frequency.

Figure 5:
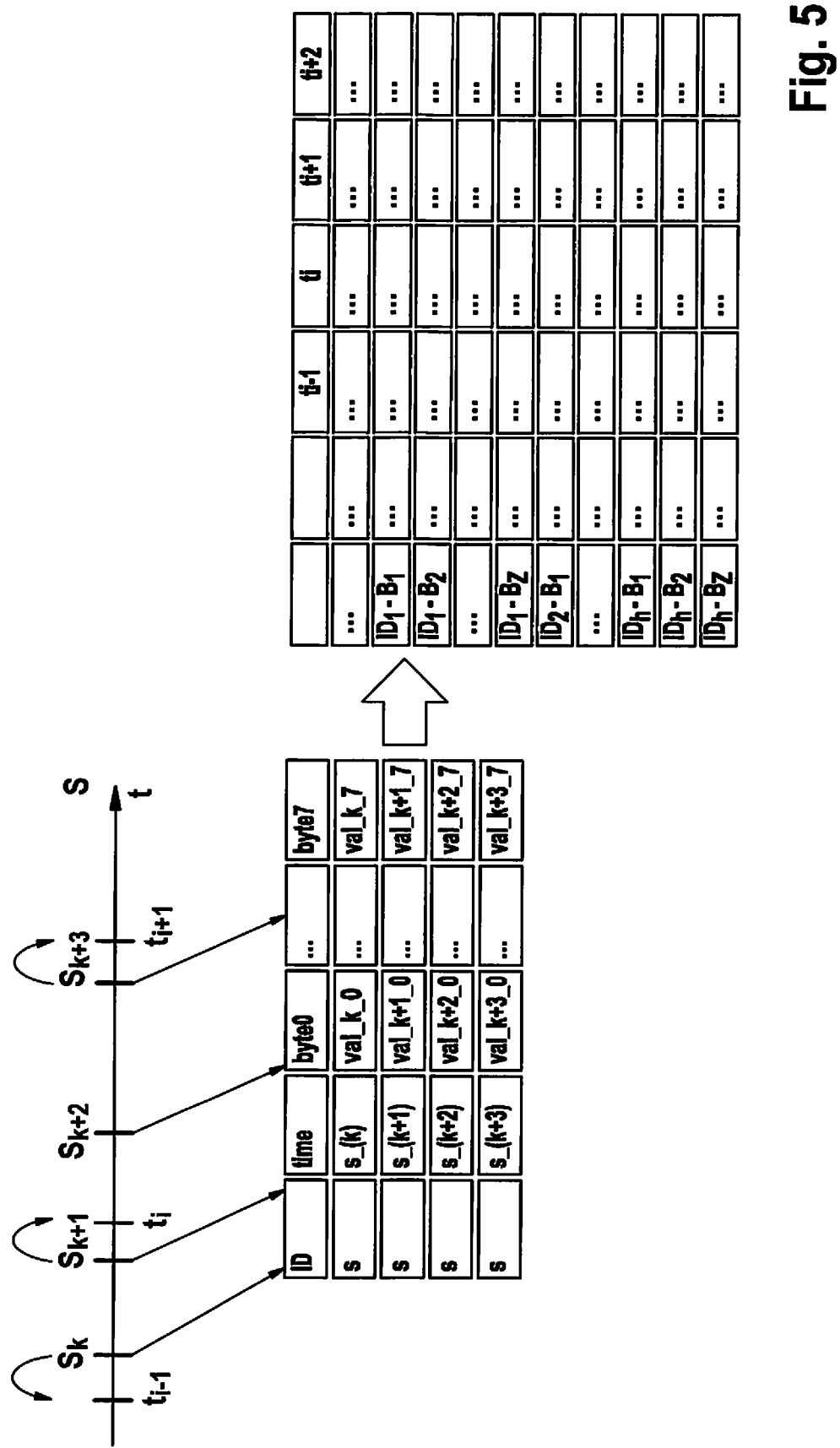
FIG. 5 shows a representation for illustrating the procedure for creating a communication matrix.

In a subsequent step S2, a matrix M is constructed, as is illustrated in FIG. 5. The columns correspond to the points in time $t_1, \ldots, t_n$ of reference time signal t.

To construct matrix M, one associated time signal ($s=(s_1, s_m)$) each, which indicates the time stamps of the appearance of the data packet provided with the respective ID identifier, is extracted for one or for multiple selected ID identifiers or for all ID identifiers $ID_{1 \ldots h}$ (with a number h of ID identifiers considered).

For each reference point in time $t_{i=1 \ldots n}$ of the reference time signal, a point in time $s_k$ is then subsequently selected for each of selected ID identifiers ID from time signal s associated with the ID identifier. This may take place in such a way, for example, that for each reference point in time $t_{i=1 \ldots n}$, a point in time $s_k$ is selected, which is nearest the relevant reference point in time, namely determined by $$k = \arg\min_{j=1 \ldots m} |t_i - s_j|$$

To find the time comparison signal, one or multiple auxiliary conditions such as, for example, the point in time of the time stamp is to follow chronologically the reference point in time, may also be taken into consideration, in addition to the aforementioned relation.

For each data portion $B_{1 \ldots z}$, each of data packets P of selected ID identifiers $ID_{1 \ldots h}$ is then incorporated as separate lines in matrix M. For this purpose, the values of the data portions assigned to respective reference points in time $t_{i=1 \ldots n}$ (columns) are inserted in the column assigned to respective reference point in time $t_{i=1 \ldots n}$.

In this way, a matrix M is constructed, which contains the values of individual data portions $B_{1 \ldots z}$ of each of selected ID identifiers $ID_{1 \ldots k}$ that are assigned to successive points in time $t_{i=1 \ldots n}$. Instead of the values, it may also be specifications.

Various interpolation methods, in particular, may be used here such as, for example, Nearest Neighbor, Linear Mixed Neighbor, Previous Neighbor, Shape-Preserving Piecewise Cubic Interpolation and the like. It is possible, of course, to construct the matrix differently. For example, the sequence of the lines has no separate relevance or the matrix could also be formed with lines and columns reversed.

Once matrix M is created, a correlation matrix K may be calculated in step S3. This may be carried out, for example, with the aid of a Pearson correlation. A correlation coefficient according to Pearson represents a measure for the strength of a linear correlation between two variables.

The Pearson correlation coefficient $k_{za,zb}$ between two different lines Za, Zb of correlation matrix M may be calculated based on the following formula:

$$k_{za,zb} = \frac{\text{cov}(Za, Zb)}{sqrt(\text{Var}(Za) * \text{Var}(Zb))}$$

Other methods may also be used for ascertaining correlation coefficients for time rows such as, for example, Spearman's rank correlation coefficient.

The entries $k_{za,zb}$ of correlation matrix K indicate how strongly the various rows of data portion B are correlated with one another. The values of correlation coefficients approaching 1 point to a strongly positive correlation, a value approaching −1 points to a strongly negative correlation. A correlation coefficient of the value 0 indicates that corresponding data portions B are uncorrelated with the same or with different data packets P.

Figure 6:
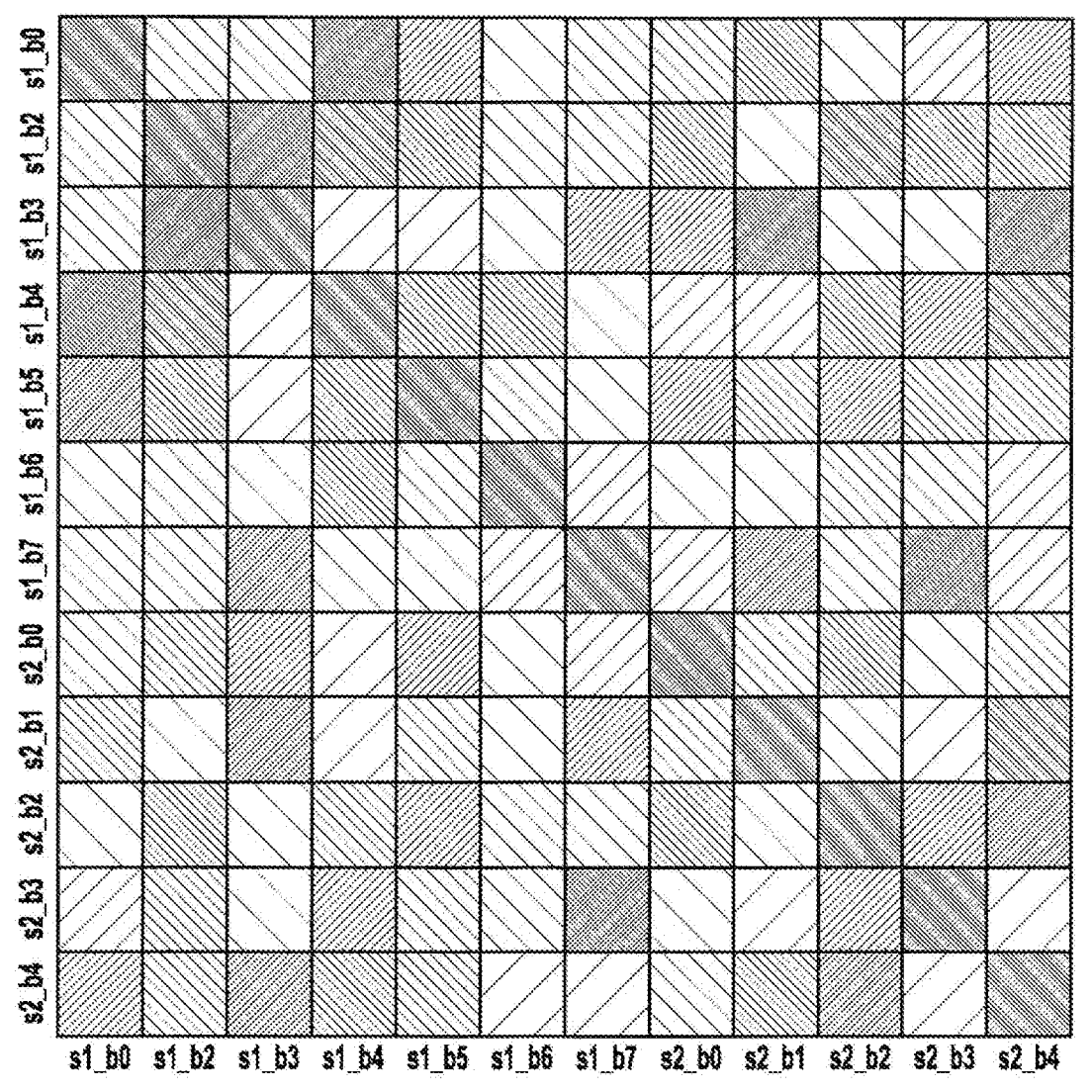

FIG. 6 depicts a graphic visualization of an exemplary correlation matrix K, different shadings corresponding to different correlation coefficients.

In a step S4, rules for the anomaly recognition may be derived from the correlation matrix.

Thus, for example, predefined threshold values $\delta_+$ and $\delta_-$ may be used so that only correlations having correlation coefficients greater than $1-\delta_+$ or smaller than $-1+\delta$ may be considered for generating rules. From this, a rule may be derived, for example, which may have a form:

"If the value of the x-th data portion of the ID identifier IDw increases, so too does the value of the y-th byte of the ID identifier IDv"

This corresponds to the example for data portions, which are strongly positively correlated.

Rules may also be established, which check the compliance of the correlation coefficients at least within a defined tolerance range. For this purpose, a time window T may be defined, for example, in which a data section from the communication via communication bus 3 is detected and a corresponding matrix MT' is constructed as described above, which is based on a corresponding reference time signal $t_T$. The corresponding correlation matrix $K_T$ to $M'_T$ may be ascertained as described above. Correlation matrices M, $M_T'$ may then be checked for deviations of correlation values k. If there are no deviations beyond defined tolerances, rules may thus be defined, which are based on the correlation values between two different data portions. This means, an anomaly is identified if there is a significant change of a correlation between two data portions of data segments having different ID identifiers.

Alternatively, time windows T1, T2, T3, . . . may be iteratively defined and the associated correlation matrices may be calculated. As a rule, it is to be assumed that the changes of correlation coefficients are smaller than a predefined absolute tolerance value. By locating a change of one of the correlation coefficients that exceeds the absolute tolerance value, it is also possible to look for sudden changes in the correlation values in a continuous comparison in order to locate an anomaly.

In addition to creating new rules for rule-based anomaly recognition, the correlation matrix may also be utilized as pre-processing for the anomaly recognition with the aid of a convolutional neural net.

Thus, multiple correlation matrices K(W1 . . . c) for data stream sections in various time windows W1 . . . c may be used in order to train a convolutional neural net, the associated matrices M' being interpreted as an "image".

Various conventional methods for recognizing anomalies may be used. From these, rules many then in turn be derived (such as, for example, in the case of the autoencoders in the form:

"If the reconstruction error is greater than a predefined threshold, signal an anomaly".

Thus, the rules are not derived directly from the correlation matrix, but indirectly from the following method.

Anomaly recognition with (convolutional) autoencoders: autoencoders have the same dimension as an input variable and an output variable. As an optimization goal when training an autoencoder, the reconstruction error is minimized. If the system is trained for normal data, it is to be assumed that normal data may be easily reconstructed, i.e., exhibit a small reconstruction error, anomalies on the other hand may be only poorly reconstructed, and therefore exhibit a large reconstruction error. An anomaly is recognized if the reconstruction error in an input is above/below a defined threshold. In an autoencoder trained for one or multiple correlation matrices, therefore, an anomaly may be ascertained based on a reconstruction error. A corresponding rule may therefore be directed to a threshold value comparison of a reconstruction error for a correlation matrix.

Anomaly recognition with LSTM (Long short-term memory): LSTM takes time dependencies into account during training. During training, they may be conditioned, for example, to predict a subsequent sequence to a data stream section. If such a system is trained for normal data, it is to be assumed that the system for normal data easily predicts a subsequent sequence and makes only a poor prediction for anomaly data. It is recognized as an anomaly if the deviation of predicted sequences from the real data is greater/smaller than a predefined threshold.

Anomaly recognition with the aid of Generative Adversarial Networks (GANs): GANs may be used in order to create a monitored learning problem from an unmonitored learning problem (only presentation of normal data) by conditioning the generator of the GAN to generate anomalies by adeptly choosing a cost function to be optimized. At the same time, the discriminator is trained to be able to distinguish normal data from these anomalies. If this system is trained long enough, the discriminator is thus able to distinguish anomaly data from real data. The probability for the appearance of an anomaly is indicated, for example, as the output of the discriminator. In the trained state, the discriminator may then be used as an anomaly recognition system, for example, with the aid of a threshold value comparison.

What is claimed is:

1. A method for creating at least one rule for a rule-based anomaly recognition method for recognizing anomalies in a data stream made up of data packets, each of the data packets including a respective data segment made up multiple data portions, and each data packet of the data packets having a respective time stamp contained within the data packet and a respective data packet type contained within the data packet, the method comprising:
providing a reference time signal having successive reference points in time;
selecting multiple data packets from the data packets of the data stream based on at least one selected data packet type;
ascertaining, for each respective data portion of at least two of the multiple data portions from the selected multiple data packets, a respective time series of successive values of the respective data portion, wherein values of each of the respective time series are the successive values of the respective data portion extracted from the selected multiple data packets or are ascertained via an interpolation method from the successive values of the respective data portion extracted from the selected multiple data packets, each of the values of the respective data portion being assigned to a respective reference point in time of the reference points in time;
carrying out a correlation method to ascertain, in each case, a respective correlation value for two different time series of the respective time series, the respective correlation value indicating of how strongly the two different time series are correlated to each other; and
creating the at least one rule for the rule-based anomaly recognition method as a function of the ascertained respective correlation value.

2. The method as recited in claim 1, wherein the reference time signal is predefined by points in time of time stamps of successive data packets having a selected data packet type or by points in time of an equidistant time vector at a predefined frequency.

3. The method as recited in claim 1, wherein the values of each respective data portion of the at least two of the multiple data portions are assigned to the reference points in time by selecting, for each of the reference points in time, a time stamp from the time stamps of the selected multiple data packets, the time stamp being nearest the reference point in time, and the value of the each respective data portion from a data packet of the selected multiple data packets having the selected time stamp is added to the respective time series.

4. The method as recited in claim 1, wherein the values of each of the respective time series are ascertained via the interpolation method from the values of the respective data portion, the interpolation method including Nearest Neighbor, or Linear Mixed Neighbor, or Previous Neighbor, or Shape-Preserving Piecewise Cubic Interpolation.

5. The method as recited in claim 1, wherein the ascertained respective correlation value is ascertained using a Pearson correlation.

6. The method as recited in claim 1, wherein the at least one rule for the anomaly recognition is derived from the ascertained respective correlation value by creating a rule for those data portions, for which the ascertained respective correlation value has an absolute value that is greater than a predefined correlation threshold, the rule specifying that a chronological change of values of related data portions in data packets transmitted in chronological succession is concurrent or is non-concurrent.

7. The method as recited in claim 1, wherein the at least one rule for the anomaly recognition is derived from the ascertained respective correlation value by ascertaining correlation values for two different data portions, in each case, for multiple data stream sections of the data stream, the rule specifying that a change of the correlation values obtained from the multiple data stream sections falls below a predefine threshold value, in terms of absolute value.

8. The method as recited in claim 1, wherein the respective data packet type contained within each of the data packets is an ID identifier.

9. The method as recited in claim 1, wherein the at least one rule is generated using a convolutional autoencoder, of a Long short-term memory ("LSTM") of a Generative Adversarial Network (GAN).

10. A method for recognizing anomalies, the method comprising:
checking data packets of a data stream for anomalies in accordance with at least one rule, each of the data packets including a respective data segment made up of multiple data portions, and each data packet of the data packets having a time stamp contained within the data packet and a data packet type contained within the data packet, the at least one rule being created by performing:
providing a reference time signal having successive reference points in time;

selecting multiple data packets from the data packets of the data stream based on at least one selected data packet type;

ascertaining, for each respective data portion of at least two of the multiple data portions from the selected multiple data packets, a respective time series of successive values of the respective data portion, wherein values of each of the respective time series are the successive values of the respective data portion extracted from the selected multiple data packets or are ascertained via an interpolation method from the successive values of the respective data portion extracted from the selected multiple data packets, each of the values of the respective data portion being assigned to a respective reference point in time of the reference points in time;

carrying out a correlation method to ascertain, in each case, a respective correlation value for two different time series of the respective time series, the respective correlation value indicating of how strongly the two different time series are correlated to each other; and creating the at least one rule for the rule-based anomaly recognition method as a function of the ascertained respective correlation value.

11. An electronic, non-transitory memory medium on which is stored a computer program for creating at least one rule for a rule-based anomaly recognition method for recognizing anomalies in a data stream made up of data packets, each of the data packets including a respective data segment made up of multiple data portions, and each data packet of the data packets having a respective time stamp contained within the data packet and a respective data packet type contained within the data packet, the computer program, when executed by a computer, causing the computer to perform:

providing a reference time signal having successive reference points in time;

selecting multiple data packets from the data packets of the data stream based on at least one selected data packet type;

ascertaining, for each respective data portion of at least two of the multiple data portions from the selected multiple data packets a respective time series of successive values of the respective data portion, wherein values of each of the respective time series are the successive values of the respective data portion extracted from selected multiple data packets or are ascertained via an interpolation method from the successive values of the respective data portion extracted from the selected multiple data packets, each of the values of the respective data portion each being assigned to a respective reference point in time of the reference points in time;

carrying out a correlation method to ascertain, in each case, a respective correlation value for two different time series of the respective time series, the respective correlation value indicating of how strongly the two different time series are correlated to each other; and creating the at least one rule for the rule-based anomaly recognition method as a function of the ascertained respective correlation value.

\* \* \* \* \*